(12) United States Patent
Kuznetsov et al.

(10) Patent No.: US 7,505,890 B2
(45) Date of Patent: Mar. 17, 2009

(54) HARD DISK DRIVE EMULATOR

(75) Inventors: Sergei Kuznetsov, Voorhees, NJ (US); John Denison, Bensalem, PA (US)

(73) Assignee: Cox Communications, Inc., Atlanta, GA (US)

(*) Notice: Subject to any disclaimer, the term of this patent is extended or adjusted under 35 U.S.C. 154(b) by 1209 days.

(21) Appl. No.: 10/342,682

(22) Filed: Jan. 15, 2003

(65) Prior Publication Data

US 2004/0138868 A1 Jul. 15, 2004

(51) Int. Cl.
 *G06F 9/455* (2006.01)
(52) U.S. Cl. ............... 703/27; 703/23; 711/111; 711/112; 711/168; 714/5; 714/6; 714/763; 714/773
(58) Field of Classification Search ........... 703/27, 703/24, 23; 711/118, 113, 111, 168; 707/104.1, 707/101, 104; 365/200, 171, 185.11; 709/203, 709/222; 463/40, 42; 713/2; 455/90.3; 710/1; 718/100; 714/5, 6, 773, 763
See application file for complete search history.

(56) References Cited

U.S. PATENT DOCUMENTS

| | | | | |
|---|---|---|---|---|
| 5,077,737 A | * | 12/1991 | Leger et al. | 714/6 |
| 5,493,574 A | * | 2/1996 | McKinley | 714/773 |
| 5,867,686 A | * | 2/1999 | Conner et al. | 711/168 |
| 5,974,547 A | * | 10/1999 | Klimenko | 713/2 |
| 6,169,687 B1 | * | 1/2001 | Johnson | 365/171 |
| 6,238,290 B1 | * | 5/2001 | Tarr et al. | 463/40 |
| 6,353,910 B1 | * | 3/2002 | Carnevale et al. | 714/763 |
| 6,654,816 B1 | * | 11/2003 | Zaudtke et al. | 710/1 |
| 6,701,450 B1 | * | 3/2004 | Gold et al. | 714/5 |
| 7,117,421 B1 | * | 10/2006 | Danilak | 714/763 |
| 2001/0001158 A1 | * | 5/2001 | Tetrick | 714/763 |
| 2002/0129204 A1 | * | 9/2002 | Leighnor et al. | 711/118 |
| 2002/0154543 A1 | * | 10/2002 | Conley et al. | 365/185.11 |
| 2003/0110351 A1 | * | 6/2003 | Blood et al. | 711/111 |
| 2003/0149700 A1 | * | 8/2003 | Bolt | 707/101 |
| 2003/0181168 A1 | * | 9/2003 | Herrod et al. | 455/90.3 |
| 2003/0200290 A1 | * | 10/2003 | Zimmerman et al. | 709/222 |
| 2003/0200379 A1 | * | 10/2003 | Hollingsworth et al. | 711/103 |
| 2004/0054689 A1 | * | 3/2004 | Salmonsen et al. | 707/104.1 |
| 2004/0080988 A1 | * | 4/2004 | Harari et al. | 365/200 |
| 2004/0093373 A1 | * | 5/2004 | Hansen | 709/203 |
| 2004/0097288 A1 | * | 5/2004 | Sloate et al. | 463/42 |
| 2004/0098244 A1 | * | 5/2004 | Dailey et al. | 703/24 |
| 2004/0194086 A1 | * | 9/2004 | Suzaki | 718/100 |

OTHER PUBLICATIONS

Wong, W., "Flash-based Microcontrollers are rapidly taking charge", Electronic Design, Nov. 25, 2002, pp. 53-56.
Dram Mobile SDRAM, Samsung Electronic, www.samsungelectronics.com/semiconductors/cram/mobile_dram/mobile_dram.htm, Dec. 4, 2002, pp. 1-2.

(Continued)

*Primary Examiner*—Paul L Rodriguez
*Assistant Examiner*—Kandasamy Thangavelu
(74) *Attorney, Agent, or Firm*—Merchant & Gould

(57) ABSTRACT

A hard disk drive (HDD) emulator comprises a dynamic random access memory, a controller that refreshes content of the dynamic random access memory, and an input/output port coupled to the controller. The input/output port provides a hard disk drive interface. An operating system of a computing system in which the HDD emulator is installed uses the dynamic random access memory as a swap storage space.

23 Claims, 6 Drawing Sheets

OTHER PUBLICATIONS

Neel, D., "Transforming the datacenter", InfoWorld, http://staging.infoworld.com/articles/fe/xml/02/-1/28/020128feedge.xml?Template+/stor, Nov. 11, 2002, pp. 1-3.

"Server blade", The Center for Nanoelectronics Business, http://webopedia.com/TERMS/s/server_blade.html, Nov. 11, 2002, pp. 1-2.

"The Skinny on Server Blades", ServerWatch™, www.serverwatch.com/tutorials/article/php/1355111, Nov. 11, 2002, pp. 1-15.

Spintronics-MRAM, Motorola, www.motorola.colm/content/0,1037,296,00.html, Nov. 27, 2002, pp. 1-2.

"Bladed Supercomputing Cluster", HiServer™ 420, Nexcom, www.nexcom/com.tw/product/bladeserver/hiserver420/, Dec. 3, 2002, pp. 1-3.

ProLiant BL p-Class, Quick Specs, http://h18000.www1.hp.com/products/quickspecs/11411_div/11411_div.html, Dec. 2, 2002, pp. 1-46.

* cited by examiner

HARD DISK DRIVE EMULATOR

FIELD OF THE INVENTION

The present invention is related to data storage systems generally, and more specifically to hard disk drive emulators.

BACKGROUND

Hard disk drives have been used in virtually all server computers built since the late 1980's, while the architecture of these computers has undergone sweeping changes. The use of server computers comprising a plurality of modular server blades is becoming more prevalent in systems previously utilizing unitary servers and server farms. A server blade is a circuit board populated with the components of a computer, such as a processor, memory (random access and read-only memory), a system bus, a hard disk drive and a network connection. Each blade is an independent system with its own memory, processor and network connection. Bladed servers stack numerous independent lower-end servers within a single cabinet. Due to their compact size, multiple blade servers can be placed in a single server rack or enclosure, allowing numerous systems to share electricity and HVAC resources.

Server blades are more cost-efficient, smaller and consume less power than traditional box-based servers. One source of their appeal lies in the fact that they may be inserted in a rack to conserve space. For example, one exemplary chassis manufactured by IBM can hold up to 14 processor blades. Six chassis can fit into a server rack, which could house up to 168 processors, or about double what a rack would house if stuffed with traditional "pizza box" servers.

Server blades have been designed for dedicated applications such as Web servers and caching servers that deliver Web pages to Internet browsers, SSL servers for encrypted communication, streaming servers for audio and video transmissions, running firewalls to keep intruders out of corporate networks, and housing DNS (domain name system) indexes that enable one computer to find another on the Internet.

Another advantage of server blades is their scalability. In subscriber service businesses, it is desirable to be able to grow server processing capacity to match increases in the subscriber base. For example, in an interactive television system it is desirable to increase processing in proportion to the number of subscribers (or the expected number of simultaneous subscriber sessions).

Implicit in the server blade model is the ability to retain some or all of the existing server blades when a new blade is added. The first server blades initially installed in a given rack may remain in service longer than a traditional unitary server. Therefore, a method of increasing the lifecycle of a server blade is advantageous. In addition, the use of "blade" servers will potentially increase the number of computers to be maintained in many facilities by orders of magnitude. For example, as noted above, more than one hundred blades can be installed in the space of a traditional server. The administrator of the blade server has to maintain the hardware and software in each blade. Because of the number of blades in a system can far exceed the number of traditional servers they replace, methods for improving the reliability of a server blade are also advantageous.

The main mechanical component (and likely point of failure) of a server blade is the hard disk drive (HDD), which provides the main non-volatile mass storage. Typical commercially available HDDs include a disk that spins at a speed of 7200 revolutions per minute. The disks rotate on bearings, which are prone to failure.

More reliable systems are desired.

SUMMARY OF THE INVENTION

A hard disk drive (HDD) emulator comprises a dynamic random access memory, a controller that refreshes content of the dynamic random access memory, and an input/output port coupled to the controller. The input/output port provides a hard disk drive interface. An operating system of a computing system in which the HDD emulator is installed uses the dynamic random access memory as a swap storage space.

DETAILED DESCRIPTION

Figure 1:
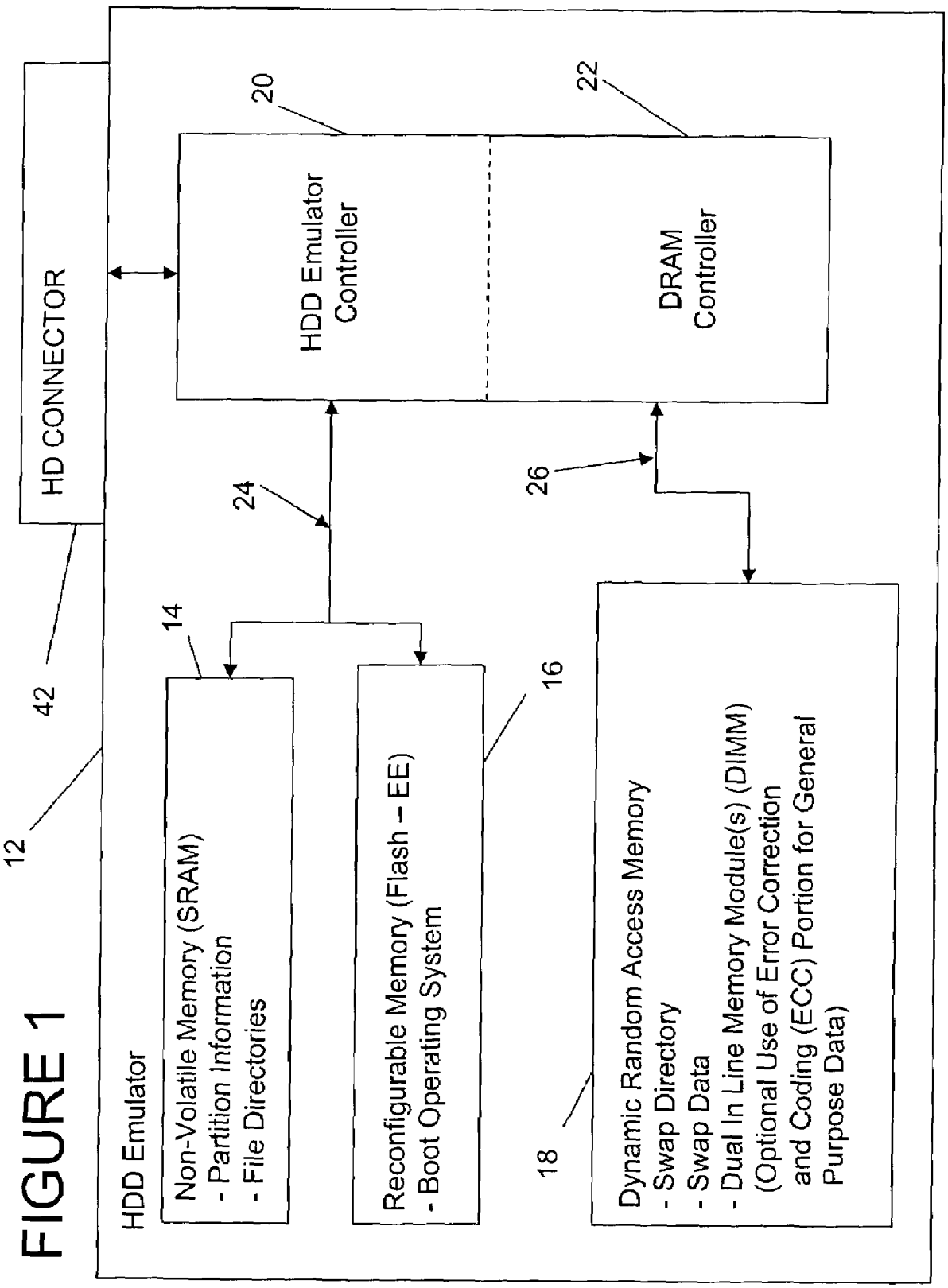
FIG. 1 is a block diagram of an exemplary HDD emulator.

FIG. 1 is a block diagram of an exemplary hard disk drive (HDD) emulator 12. The HDD emulator 12 includes a dynamic random access memory (DRAM) 18 and a controller 20 that refreshes content of the DRAM. At least part of the DRAM 18 of the HDD emulator 12 is used as the swap storage space of a virtual memory system.

HDD emulator 12 provides a standard HDD physical and electrical interface 42, capable of communicating with any processor (e.g., processor 32 shown in FIG. 2) that is otherwise configured to communicate with a hard disk drive. HDD emulator 12 has an input/output port 42 coupled to the HDD emulator controller 20. The input/output port 42 provides the physical hard disk drive interface. In some embodiments, the input/output port 42 is an integrated drive electronics (IDE) connector, such as those used in advanced technology attachment (e.g., ATA/66, ATA/100) disk drives. In other embodiments, the connector complies with the small computer system interface (SCSI) standard used in many APPLE™ and UNIX systems. In still other embodiments, the connector complies with the universal serial bus (USB) interface standard. Other embodiments include other types of connectors corresponding to other interfaces suitable, for high speed data transfer.

Use of a standard connector interface allows HDD emulator 12 to be connected to a server blade, a unitary server, a desktop computer, a laptop computer, or other type of computer. The HDD emulator 12 may alternatively be connected to the processor of a television set top box used to receive and process cable or satellite television signals. Some of the advantages of the exemplary HDD emulator 12 are best realized when the emulator is used by a computer configured to use virtual memory.

Typical conventional computing systems that support a virtual memory model and a hard disk drive for the swap partition of a virtual memory. Virtual memory may be viewed as an imaginary memory area supported by operating systems such as Windows, OS/2 and UNIX. Virtual memory may also be viewed as an alternate set of memory addresses. Programs use these virtual addresses rather than real addresses to store instructions and data. When the program is executed, the virtual addresses are translated (mapped) into physical memory addresses. Virtual memory essentially enlarges the usable physical address space, the set of addresses a program can use. For example, virtual memory might contain two to four times as many addresses as main memory. A program larger than the main memory would not be able to fit in main memory all at once, but the computer could execute such a program by copying into main memory those portions of the program needed at any given point during execution.

The operating system divides virtual memory into pages, each of which contains a fixed number of addresses. Each page is stored on a mass storage medium. When the page is needed in the main memory, the operating system copies (swaps) it from mass storage medium to main physical memory, translating (mapping) the virtual addresses into real addresses.

In the exemplary embodiments, the mass storage medium for the swap partition is implemented in solid state devices within the HDD emulator 12. In one preferred embodiment, the swap directory and swap data are stored in DRAM 18. The DRAM 18 may include any commercially available DRAM devices, such as individual RAM chips, or a printed circuit board with memory devices mounted thereon, such as a single in-line memory module (SIMM), a dual in-line memory module (DIMM), or Rambus memory module (RIMM). The memory may be of any variety, such as Extended Data Output DRAM (EDO DRAM), Burst EDO DRAM, Fast Page Mode RAM (FPM RAM), Synchronous DRAM (SDRAM), Mobile SDRAM, Rambus DRAM (RDRAM), or SyncLink DRAM (SLDRAM). Other memory chips or other types of circuit boards having memory mounted thereon may be used.

One of ordinary skill in the art can readily set the location of the swap partition of the virtual memory using conventional operating system functions. For example, in a WINDOWS 98 operating environment, a partition can be created in the HDD Emulator 12 using the standard FDISK routine. Then, under the "Performance" tab of the WINDOWS 98 system properties dialog box, a "Virtual Memory" button is provided to set virtual memory parameters. In the "Virtual Memory" dialog box, the drive letter of the HDD emulator is specified. Because HDD Emulator 12 has an input/output interface 42 that conforms to that of a standard HDD, one of ordinary skill can readily determine the procedure for setting the swap partition in the HDD emulator for other operating systems using virtual memory.

Similarly, using conventional operating system functions, the HDD emulator 12 can be partitioned to establish separate partitions for the SRAM 14 and Flash EEPROM 16.

Preferably, the total amount of DRAM 18 in HDD emulator 12 is at least about four times as large as the main memory 36 of the processor system in which the HDD emulator is installed. For example, in a server blade 30 having 512 MB of main memory, the HDD emulator preferably has at least 2.0 GB of DRAM 18 for swap space.

The DRAM 18 may optionally include error correction coding (ECC) memory devices or non-ECC memory devices. ECC memory devices have extra bytes, which are used with special circuitry for testing the accuracy of data as it passes in and out of memory. In some embodiments that include ECC memory, the memory cells that are provided for storing error correction codes are used for storing additional swap data, as described further below. Other embodiments use the ECC circuitry provided by the manufacturer for word error correction, although the efficiency of memory usage is not as great.

DRAM combines high access speed and high reliability with low cost relative to non-volatile solid state memory media, and is advantageous for any application that does not require non-volatile storage.

In some embodiments, HDD emulator 12 further includes at least one additional non-volatile solid-state storage medium for persistent storage. For example, in some embodiments, an electrically erasable programmable read only memory (EEPROM) or flash EEPROM 16 is used to store a boot operating system, and optionally, one or more application programs. Both EEPROM and flash EEPROM can be erased by exposing them to an electrical charge. A flash EEPROM can be erased and reprogrammed in blocks instead of one byte at a time, and is thus faster than an EEPROM. Like other types of PROM, EEPROM and flash EEPROM retain their contents even when the power is turned off, but they are not as fast as RAM (in either storage or retrieval). Also, EEPROM and flash EEPROM are subject to "wear," or degradation after many repeated write cycles. Flash chips generally have lifespans from 100K to 300K write cycles. Therefore, flash EEPROMs are preferred for storing types of data that are updated relatively-infrequently, but are not preferred for a swap partition.

In some embodiments, HDD emulator 12 further includes a non-wearable, non-volatile memory device that does not degrade, even after frequent writes. For example, some embodiments include a non-volatile static random access memory (SRAM) 14 with a battery for backup power. The emulator controller 20 causes the non-volatile SRAM 14 to store at least one of the group consisting of partition information and file directory information. The partition information identifies the location of the swap partition in DRAM, allowing the operating system to swap data between the virtual memory and the real memory. Non-volatile SRAM combines fast access speed (even faster than DRAM) and high reliability with persistence of memory.

SRAM 14 may also be used to provide a high speed cache for pages that are likely to be swapped to main memory in the near future, using a conventional cache management algorithm. In that case, HDD emulator controller 20 also includes cache controller logic.

In other embodiments, magnetoresistive RAM (MRAM) is used for the non-wearable non-volatile memory device 14. This technology has the nonvolatility characteristic of flash memory and the advantage of DRAM density (without the need for refresh). MRAM has speed that is comparable to SRAM. In alterative embodiments, MRAM may also be used for storing the partition information and file directories, in place of flash EEPROM.

As noted above, in some embodiments the DRAM 18 includes one or more ECC memory DIMMs. One exemplary embodiment takes advantage of the way whole pages (instead of individual words) of data are swapped from the virtual memory into the real memory by using a more space efficient error correction mechanism than the ECC provides. (ECC is provided on a word basis.) In the exemplary embodiment, no error correction codes are applied to individual words in DRAM 18, because the words of data are not accessed individually for swapping. Instead, an error correction algorithm is applied to the whole page, or to a block (e.g., 256 bytes or 512 bytes) that is a subset of the page, to produce block error correction codes stored in a portion 18*b* of DRAM 18. The total number of bytes that are allocated to error correction codes in portion 18*b* is less than the total number that would be allocated to ECC in cells 18*c* if word-wise error correction is employed. As a consequence, many ECC memory cells 18c are freed up from being used for error correction, and are made available for swap storage purposes. For example, a conventional cyclical redundancy code (CRC) may be used for block error encoding and correction. When the data are refreshed in the DRAM 18, the block CRC is also read and used to restore any bits that have become corrupted.

The controller 20 includes a hard drive emulator controller, and a DRAM controller 22 that controls the DRAM 18. The controllers 20 and 22 may be implemented as two separate devices, or as a single controller that performs two functions.

Figure 2:
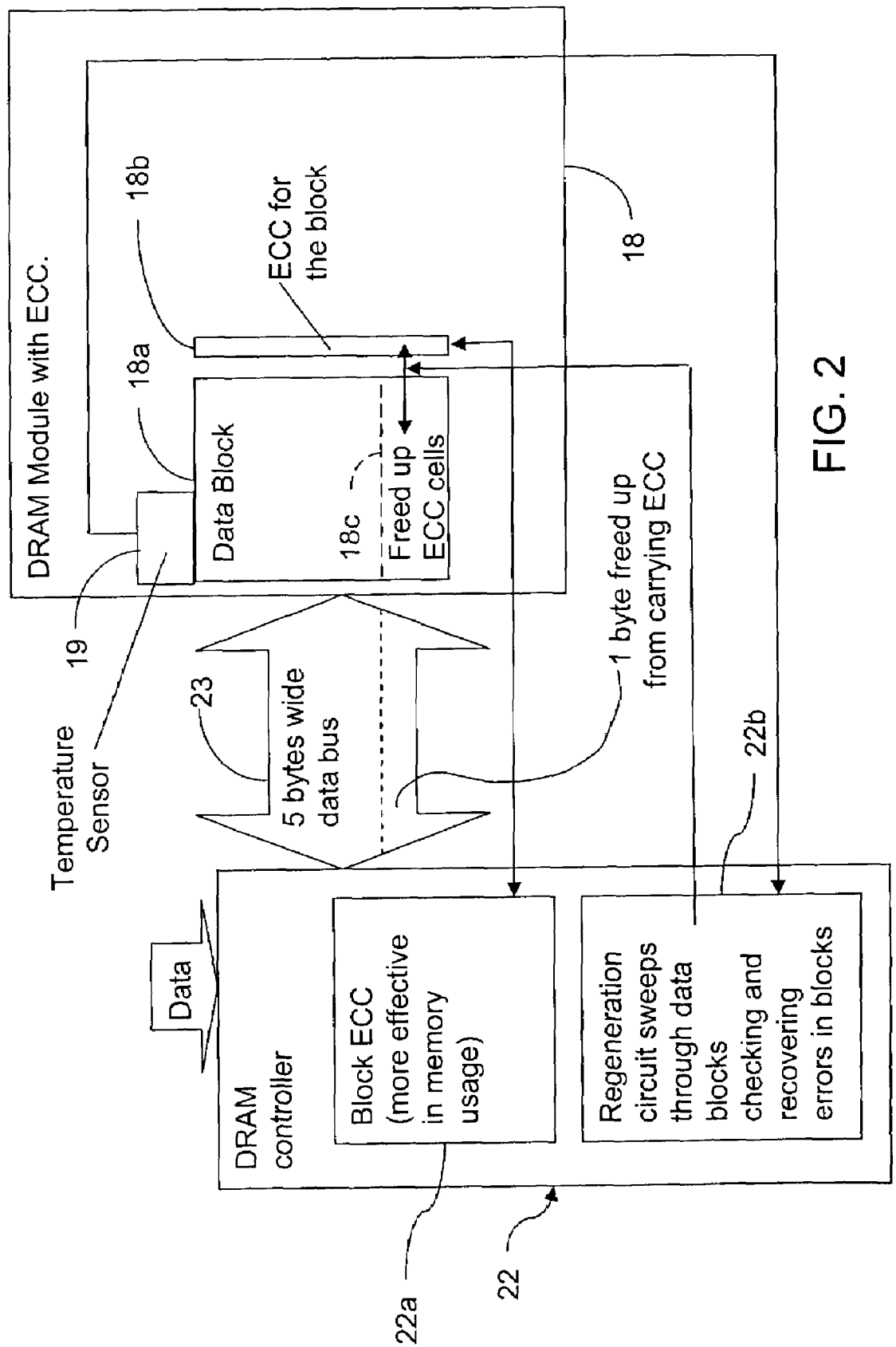
FIG. 2 is a block diagram showing the DRAM controller and DRAM of FIG. 1.

FIG. 2 shows the operation of DRAM controller 22. For purpose of example, FIG. 2 shows one block of protected data in memory cells 18a and 18c, with corresponding error correction codes in memory cells 18b. The DRAM controller 22 causes the DRAM 18 to store swapped data in both the data storage cells 18a and the ECC cells 18c.

In a conventional DRAM controller for ECC memory, the controller receives four bytes of data to be stored in DRAM and ECC circuitry generates an additional byte of ECC. Then the controller sends the four bytes of data to the storage cells and the one byte of ECC to the ECC cells of the DRAM. Similarly, when the four bytes of data are requested by the processor, the conventional controller reads the four bytes of data and the one byte of ECC, to ensure data integrity. In the embodiment of FIG. 2, however, a byte of the data base is not needed for ECC, so the full bandwidth of the data bus 23 is used to carry data, and there is no need to store ECC for each word. All memory cells in DRAM 18 can be treated the same, in terms of availability to store data.

As shown in FIG. 2, DRAM controller 22 also includes a function 22a that performs error correction coding on a block level (instead of word-by-word) using a block level algorithm, and a regeneration circuit 22b that sweeps through data blocks checking and correcting errors in blocks, based on the block error correction codes generated by function 22a. Also, as shown in FIG. 2, the data are stored in the DRAM in data blocks, which include data written in the storage cells 18a and the memory cells 18c that would be used for error correction codes if the DRAM 18 were controlled by a conventional memory controller (not shown). The block ECC memory cells 18b occupy a smaller total portion of the DRAM 18 than the total of all the ECC memory cells 18c.

Although FIG. 2 shows the block ECC data being stored in memory cells 18b that are separate from the memory cells 18c previously allocated for ECC, this is for ease of illustration only. The DRAM controller 22 may store the block error correction codes in some of the memory cells 18a previously allocated for data, in some of the memory cells 18c previously allocated for ECC, or in any combination of the two. Even if the DRAM controller 22 causes the block error correction codes to be written solely within memory cells 18c previously allocated for ECC, the block error correction codes do not occupy all of the memory cells 18c.

Although FIG. 2 shows a five-byte data bus connecting the DRAM controller 22 to the DRAM 18, this is only an example. The technique described above may be used with any bus.

FIG. 2 shows a temperature sensor 19 on the memory module, adjacent to one of the memory chips. In some embodiments, the temperature of the DRAM is sensed and provided to the regeneration circuit 22b. The regeneration circuit can then dynamically adjust the refresh rate based on the temperature. In DRAM devices, the charge in each memory cell dissipates more quickly when the temperature is higher, and more slowly when the temperature is lower. Thus, in some embodiments, regeneration circuit 22b reduces the refresh rate when the sensed temperature is lower, to conserve power.

An other feature of some embodiments is that the DRAM controller 22 has knowledge of which portions of the DRAM are in use. In a conventional main memory, data (or instructions) that are recently used are likely to be used again presently. However, when a page is swapped back from virtual memory to main memory, there is no longer a need to keep a copy of the data in the swap partition. With knowledge of which portions of the DRAM 18 are in use, and which are no longer needed, the regeneration circuit 22b can conserve power by only refreshing the areas of DRAM 18 currently being used.

In some embodiments, the selective refreshing of only currently used memory cells is combined with the temperature dependent refresh rate to further conserve power.

In some embodiments, the exemplary HDD emulator 12 is substituted for a hard disk drive in many applications, providing improved performance and reliability. In other embodiments, the HDD emulator 12 resides alongside a regular HDD as an additional drive for swap storage. In these embodiments, swap performance is improved, and hard drive wear is reduced, improving overall reliability.

Figure 3:
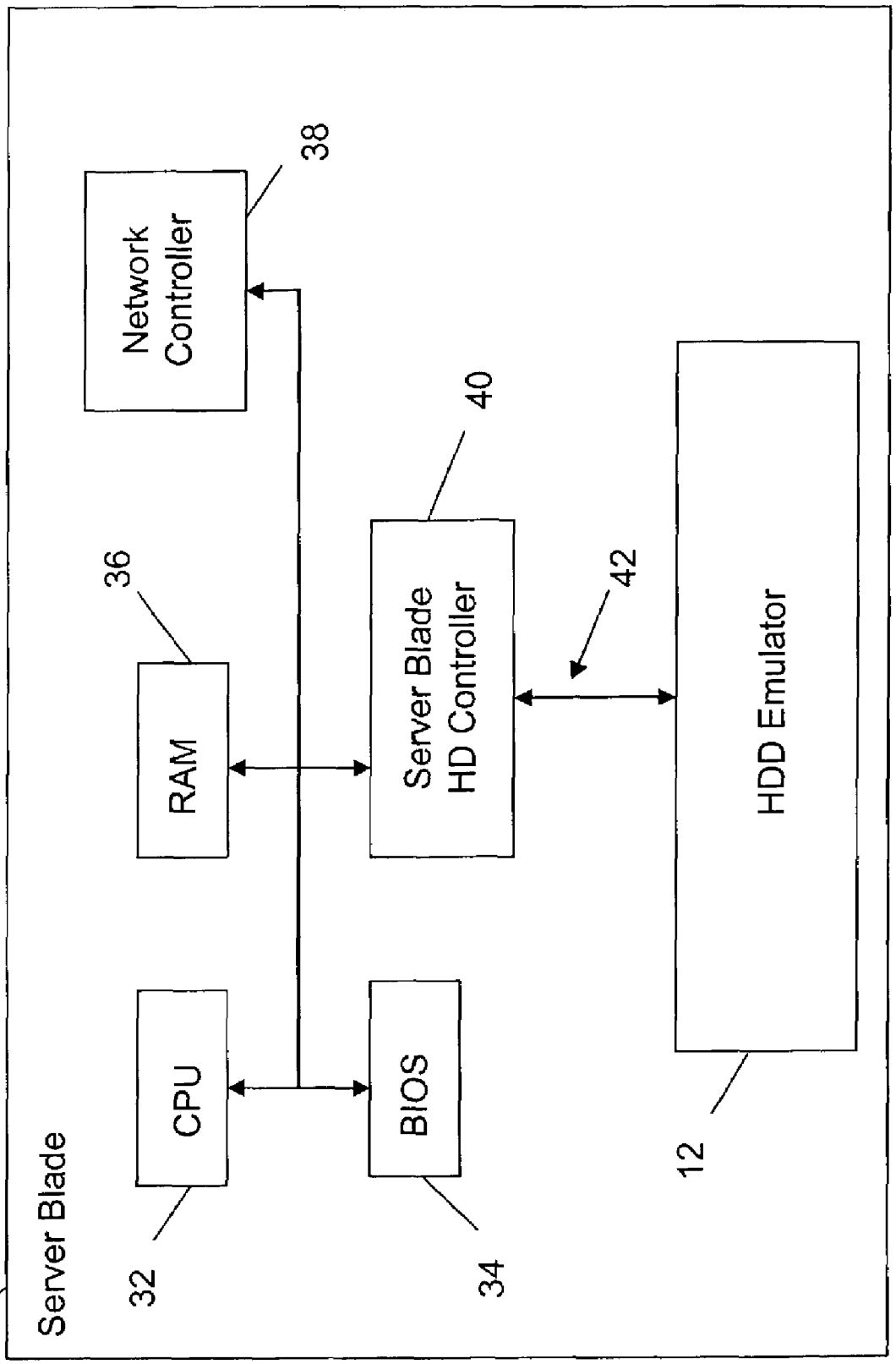
FIG. 3 is a block diagram of a server blade containing the HDD emulator of FIG. 1.

FIG. 3 is a diagram of an exemplary server blade 30 including the HDD emulator 12 on board. The server blade 30 includes a processor 32, a main memory 36, a hard disk drive (HDD) controller 40 coupled to the processor 32, BIOS 34, and an HDD emulator 12.

HDD emulator 12 has solid state memory including dynamic random access memory 18 and a DRAM controller 22 that refreshes the DRAM 18. The operating system of server blade 30 uses at least a portion of the DRAM 18 as a swap storage space. The emulator controller 20 is communicatively coupled to the HDD controller 40.

In some embodiments, the HD controller 40 has a conventional port (e.g., ATA/100 or Wide Ultra3 SCSI), and emulator 12 has a corresponding mating connector 42, as described above with reference to FIG. 1. In other embodiments, one of the group consisting of the HDD emulator 12 and the HDD controller 40 has a printed circuit board with conductive pads on its edge, and the other of the group consisting of the HDD emulator 12 and the HDD controller 40 has a clip for receiving the circuit board to form the HDD interface.

The processor 32 may be of any type suitable for a server blade including, but not limited to, a 2.8 GHz single or dual Xeon™ processor or a 1.4 GHz Pentium® III (dual capability) processor, both manufactured by Intel Corporation of Santa Clara, Calif.

Exemplary main server blade memory 36 may be of any type suitable for a server blade including, but not limited to, between 512 MB and 2 GB of ECC SDRAM.

The network controller 38 may be, for example, an Ethernet network interface card (NIC), such as a Fast Ethernet PCI controller GD82559ER with Wake On LAN feature, by Intel Corporation, or an NC3 163 10/100 Mbps Fast Ethernet adapter with Wake On LAN feature, or an NC7780 gigabit Ethernet NIC, marketed by Hewlett Packard of Palo Alto, Calif. Other network interface cards may be used.

An on board basic I/O system (BIOS) memory 34 may include a flash EEPROM, allowing updates to the BIOS. In alternative embodiments, MRAM or a read only memory may be used. For the server blade, a net-bootable BIOS may be used to load on boot operating system and applications into the server 44.

Figure 4:
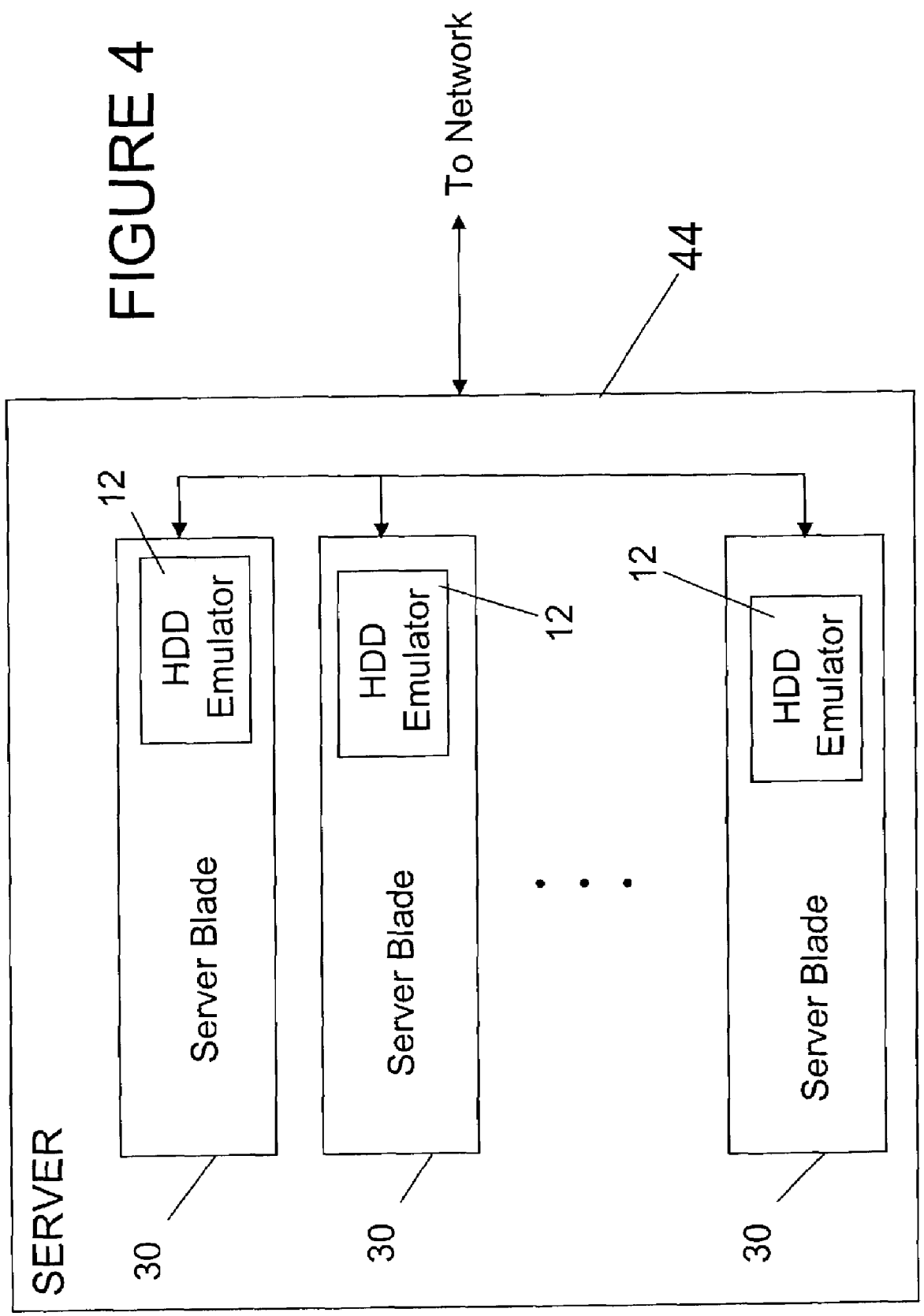
FIG. 4 is a block diagram of a server including the server blade of FIG. 3.

FIG. 4 shows an example of a server 44 including a plurality of server blades 30, at least one of which has an HDD emulator 12. In this particular example, all of the server blades 30 have HDD emulators 12. However, a single server may alternatively contain a first set of server blades 30, each of which has an HDD emulator 12, and a second set of server blades, each having a conventional HDD (not shown). Thus, the improved server blade 12 may be added to an existing server 44 that already includes one or more conventional server blades with real hard disk drives. Likewise, one or more of the server blades may be configured with both an HDD emulator 12 and an HDD.

Figure 5:
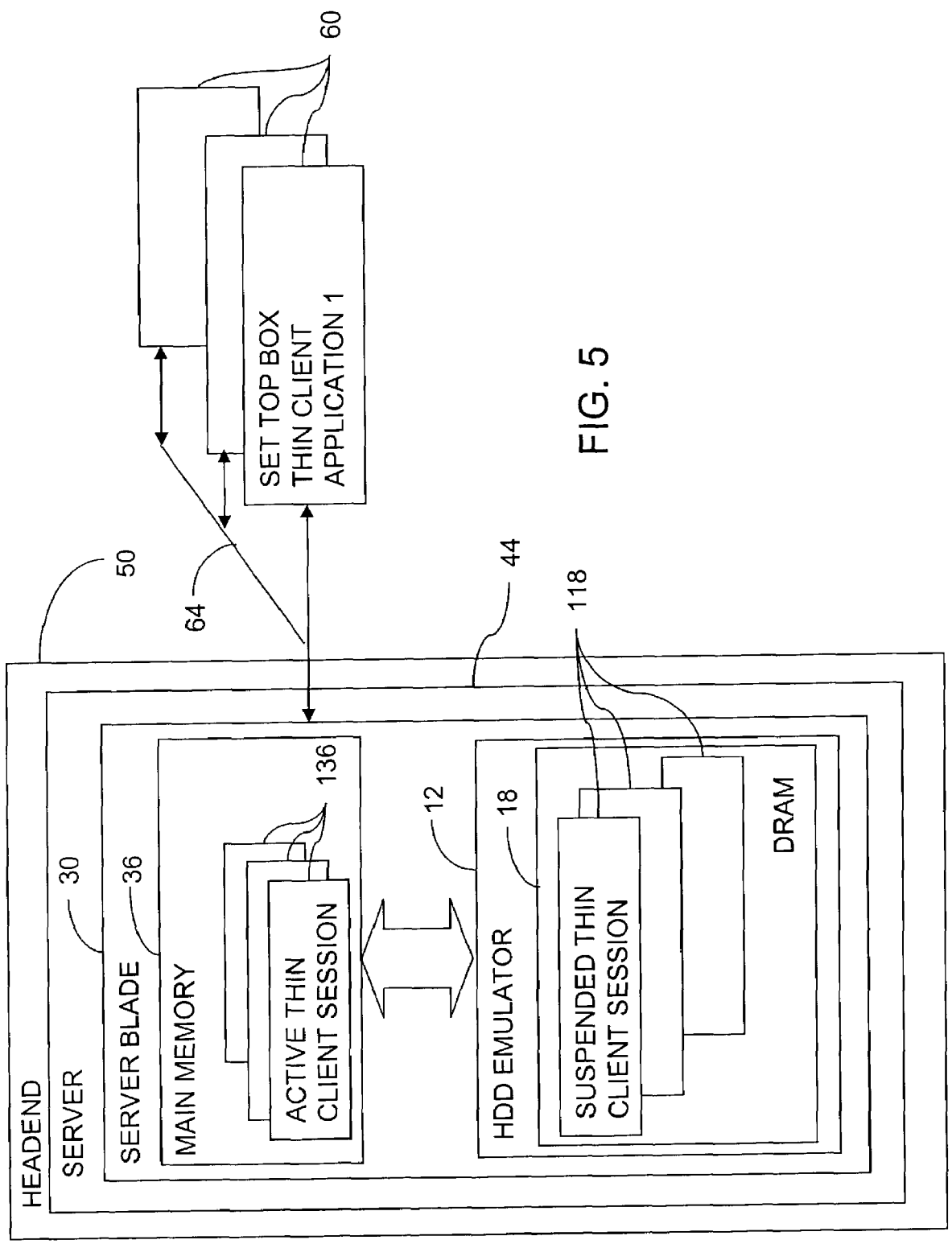
FIG. 5 is a block diagram of a cable system, including a cable headend having the server of FIG. 4 and a set top box that having the HDD emulator of FIG. 1.

FIG. 5 is a block diagram of a CATV system including the server 44 of FIG. 4. In FIG. 5, the server 44 is included in a cable headend facility 50. The headend 50 is the control center of a CATV system, where incoming signals are amplified, converted, processed, and combined into a common cable for transmission to customers. Conventional headend components, such as antennas, preamplifiers, frequency converters, demodulators, modulators, processors, and other related equipment are understood by those of ordinary skill in the art to be present, but are omitted in FIG. 5 for brevity.

The Headend 50 transmits interactive television (ITV) programs to a plurality of television set top boxes 60 (only one of which is shown in FIG. 5.). The server 44 maintains data for each active thin client session in main memory 36. In response to queries from ITV clients in the set top boxes 60, the server 44 renders web pages that are viewed by the clients. Till the next request from the thin client, the user's session in the headend 50 is suspended, and the user's session can all be swapped to HDD emulator 12. Thus, HDD emulator 12 can store data from a plurality of suspended thin client sessions 118. This allows the server memory to be used for another session with an active user.

Also shown in FIG. 5 is a set top box 60 having a thin client application for presenting the data rendered by the server 44. In some embodiments, the server 44 is coupled by a broadband cable 64 system to at least one thin client application of the set top box 60, and the server serves interactive applications to the thin client.

The cable (and satellite) television industry is an advantageous application of an HDD emulator 12 that uses DRAM memory 18 for swap space. There is no requirement to restore the information in the server swap pages after loss of power. These areas contain dynamic information. For example, the swap data 118 may have copies of inactive session data pertaining to a session with a set top box 60. A new session can be established with the user, and thus persistent storage is not required. The cable industry is also one in which server computing needs scale to the number of active customer sessions, making the bladed server model useful.

Figure 6:
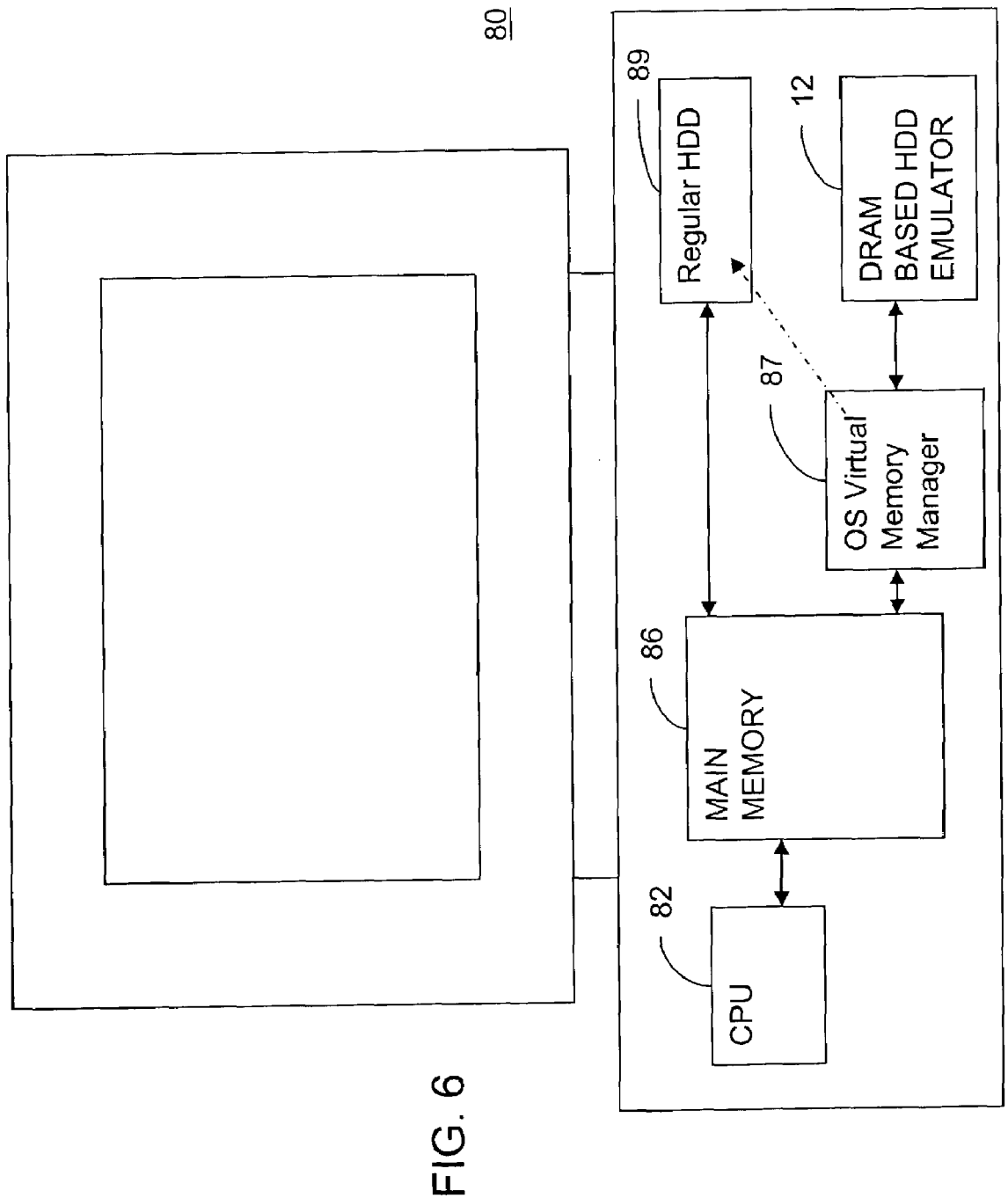
FIG. 6 is a diagram of a standalone computer including the HDD emulator of FIG. 1.

FIG. 6 shows another example, in which a computer system 80 comprises a general purpose processor 82 with main memory 86 configured to run an operating system supporting virtual memory 87. Computer 80 has a hard drive emulator 12, as shown in FIG. 1, including dynamic random access memory 18, and means 20, 22 for controlling the dynamic random access memory, so that a swap partition of the virtual memory is located in the dynamic random access memory, to support virtual memory operations of the operating system. The computer 80 may have a hard disk drive 89. The use of an HDD emulator for swap storage improves swap performance and reduces wear on the HDD 89.

Although a few specific examples of uses for the HDD emulator 12 are provided above, the HDD emulator can be used in any processor based system having an operating system that manages virtual memory by setting up a specific swap area in a hard drive, by redirecting the swap area to the HDD emulator. The HDD emulator 12 can be used in virtually any computer to improve reliability and performance by elimination of the mechanical hard drive.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A hard disk drive (HDD) emulator for use in a computing system comprising:
a dynamic random access memory;
a controller that refreshes content of the dynamic random access memory; and
an input/output port coupled to the controller, the input/output port providing a hard disk drive interface,
wherein an operating system of the computing system in which the HDD emulator is installed uses the dynamic random access memory as a swap storage space, wherein the dynamic random access memory has data storage cells and error correction coding (ECC) cells, and the controller causes the dynamic random access memory to store swapped data in both the data storage cells and the ECC cells.

2. The HDD emulator in accordance with claim 1, wherein the dynamic random access memory comprises at least one dual in-line memory module.

3. The HDD emulator in accordance with claim 1, wherein a virtual memory manager of the computing system in which the HDD emulator is installed uses the dynamic random access memory to store a swap directory and swap data.

4. The HDD emulator in accordance with claim 1, further comprising non-volatile memory, wherein the controller causes the non-volatile memory to store at least one of boot operating system files and application files.

5. The HDD emulator in accordance with claim 4, wherein the non-volatile memory comprises electrically erasable programmable read only memory.

6. The HDD emulator in accordance with claim 1, further comprising non-volatile memory, wherein the controller causes the non-volatile memory to store at least one of partition information and file directory information.

7. The HDD emulator in accordance with claim 6, wherein the non-volatile memory comprises a non-wearable memory.

8. The HDD emulator in accordance with claim 6, wherein the non-volatile memory comprises a non-volatile static random access memory.

9. The HDD emulator in accordance with claim 1, wherein the controller comprises a hard drive emulator controller, and a dynamic random access memory controller for refreshing content of the dynamic random access memory; the dynamic random access memory comprises at least one dual in-line memory module having data storage cells and ECC cells; and the dynamic random access memory controller causes the dynamic random access memory to store swapped data in both the data storage cells and the ECC cells; and the HDD emulator further comprises:
electrically erasable programmable read only memory for storing boot operating system files; and
non-volatile static random access memory for storing at least one of partition information and file directory information.

10. A server blade using a hard disk drive emulator in solid state memory, comprising:
one or more processors running an operating system;
a main memory;

a hard disk drive (HDD) controller coupled to at least one processor; and the hard disk drive (HDD) emulator comprising:

solid state memory comprising dynamic random access memory;

an emulator controller communicatively coupled to receive requests from the HDD controller, by which the operating system causes the HDD emulator to use at least a portion of the dynamic random access memory as a swap storage space, wherein the dynamic random access memory includes at least one dual in-line memory module having data storage cells and error correction coding (ECC) cells, and the emulator controller causes the dynamic random access memory to store swapped data in both the data storage cells and the ECC cells.

11. The server blade of claim 10, further comprising a hard drive interface connector coupled to the HDD controller, wherein:

the HDD emulator has an input/output port connected to the emulator controller, and the input/output port is connected to the hard drive interface connector.

12. The server blade of claim 10, further comprising electrically erasable programmable read only memory, wherein the electrically erasable programmable read only memory stores at least one of boot operating system files and application files.

13. The server blade of claim 10, further comprising non-volatile static random access memory, wherein the non-volatile static random access memory stores at least one of partition information and file directory information.

14. The server blade of claim 10, further comprising a bootable BIOS.

15. A server including a server blade, the server blade using a hard disk drive emulator in solid state memory and comprising:

one or more processors running an operating system;

a main memory;

a hard disk drive (HDD) controller coupled to at least one processor; and the hard disk drive (HDD) emulator comprising:

solid state memory comprising dynamic random access memory;

an emulator controller communicatively coupled to receive requests from the HDD controller, by which the operating system causes the HDD emulator to use at least a portion of the dynamic random access memory as a swap storage space, wherein the dynamic random access memory includes at least one dual in-line memory module having data storage cells and error correction coding (ECC) cells, and the emulator controller causes the dynamic random access memory to store swapped data in both the data storage cells and the ECC cells.

16. The server of claim 15, wherein the server is included in a headend system, which serves at least one thin client application running in a set top box of at least one user.

17. The server of claim 16, wherein:

the server is a head-end content server having a plurality of server blades, each of the plurality of server blades includes a respective hard drive emulator, and the server is coupled by a broad-band cable system to at least one thin client, and the server serves data to the thin client.

18. A computer system using a hard disk drive emulator in solid state memory, comprising:

one or more general purpose processors configured to run an operating system having virtual memory;

a hard disk drive (HDD) controller coupled to at least one processor of the one or more general purpose processors; and the hard disk drive (HDD) emulator comprising:

solid state memory comprising dynamic random access memory;

an emulator controller communicatively coupled to receive requests from the HDD controller;

wherein a swap partition of the virtual memory is located in the dynamic random access memory, to support virtual memory operations of the operating system, wherein the dynamic random access memory includes at least one dual in-line memory module having data storage cells and error correction coding (ECC) cells, and the emulator controller causes the dynamic random access memory to store swapped data in both the data storage cells and the ECC cells.

19. The computer system of claim 18, further comprising:

a system bus coupled to the one or more processors; and a hard disk interface coupled to the system bus, wherein the hard disk drive emulator is connected to the hard disk interface.

20. A method for emulating a hard disk drive in a computing system, comprising the steps of:

receiving swap data from a processor of a server blade by way of a hard disk drive connector interface of a hard disk drive (HDD) emulator; and storing the swap data in a dynamic random access memory of the hard disk drive emulator, wherein the dynamic random access memory has data memory cells and error correction coding (ECC) cells the method further comprising storing a first portion of the swap data in the data storage memory cells and a second portion of the swap data in the ECC cells.

21. The method of claim 20, further comprising storing at least one of partition information, file directory information, and a boot operating system in a non-volatile memory of the hard disk drive emulator.

22. The method of claim 21, wherein partition information and file directory information are stored in a non-volatile static random access memory of the hard disk drive emulator.

23. The method of claim 21, wherein a boot operating system is stored in a flash electrically erasable programmable read only memory of the hard disk drive emulator.

* * * * *

UNITED STATES PATENT AND TRADEMARK OFFICE
CERTIFICATE OF CORRECTION

| | | |
|---|---|---|
| PATENT NO. | : 7,505,890 B2 | Page 1 of 1 |
| APPLICATION NO. | : 10/342682 | |
| DATED | : March 17, 2009 | |
| INVENTOR(S) | : Kuznetsov et al. | |

It is certified that error appears in the above-identified patent and that said Letters Patent is hereby corrected as shown below:

Col. 6, line 4: "An other feature" should read --Another feature--

Col. 6, line 56: "or an NC3 163 10/100 Mbps" should read --or an NC3163 10/100 Mbps--

Signed and Sealed this
Eighteenth Day of January, 2011

David J. Kappos
*Director of the United States Patent and Trademark Office*